(12) United States Patent
Wang et al.

(10) Patent No.: US 12,223,644 B2
(45) Date of Patent: Feb. 11, 2025

(54) AUXILIARY PATHOLOGICAL DIAGNOSIS METHOD

(71) Applicant: DM Intelligence Medicine Ltd, Guangdong (CN)

(72) Inventors: Xunzhang Wang, Guangdong (CN); Weidong Xie, Guangdong (CN); Riqiang Deng, Guangdong (CN); Yan Yang, Guangdong (CN)

(73) Assignee: DM Intelligence Medicine Ltd, Guangzhou (CN)

( * ) Notice: Subject to any disclaimer, the term of this patent is extended or adjusted under 35 U.S.C. 154(b) by 390 days.

(21) Appl. No.: 17/619,616

(22) PCT Filed: Jul. 8, 2020

(86) PCT No.: PCT/CN2020/100950
§ 371 (c)(1),
(2) Date: Dec. 16, 2021

(87) PCT Pub. No.: WO2020/253886
PCT Pub. Date: Dec. 24, 2020

(65) Prior Publication Data
US 2022/0351370 A1    Nov. 3, 2022

(30) Foreign Application Priority Data
Jun. 18, 2019    (CN) .......................... 201910529275.7

(51) Int. Cl.
*G06T 7/00*    (2017.01)
(52) U.S. Cl.
CPC .. *G06T 7/0012* (2013.01); *G06T 2207/10061* (2013.01); *G06T 2207/20081* (2013.01); *G06T 2207/30096* (2013.01)

(58) Field of Classification Search
CPC ......... G06T 7/0012; G06T 2207/10061; G06T 2207/20081; G06T 2207/30096;
(Continued)

(56) References Cited

U.S. PATENT DOCUMENTS

| | | | |
|---|---|---|---|
| 10,198,790 B1* | 2/2019 | Owechko | H04N 5/2621 |
| 2016/0253466 A1* | 9/2016 | Agaian | G06N 5/043 |
| | | | 382/128 |

(Continued)

FOREIGN PATENT DOCUMENTS

| | | |
|---|---|---|
| CN | 106372390 A | 2/2017 |
| CN | 106569673 A | 4/2017 |

(Continued)

OTHER PUBLICATIONS

Al-Janabi et al, Whole slide images for primary diagnostics of urinary system pathology: a feasibility study, Dec. 1, 2014, JRIP, vol. 3, No. 4, pp. 91-96 (Year: 2014).*

(Continued)

*Primary Examiner* — Lewis G West

(57) ABSTRACT

The present disclosure provides an auxiliary pathological diagnosis method. The method includes: acquiring a whole slide image to be identified and patient information; inputting the whole slide image to be identified into a preset whole slide image model, and the whole slide image model outputting a diagnosis result of the whole slide image to be identified; and generating a diagnosis report based on the diagnosis result and the patient information. The present disclosure further provides an auxiliary pathological diagnosis device, a computer device, and a storage medium. The present disclosure assists doctors in disease diagnosis, so as to reduce the workload of doctors.

8 Claims, 1 Drawing Sheet

(58) Field of Classification Search
CPC .......... G06T 2207/20084; G16H 15/00; G16H 30/20; G16H 50/20
See application file for complete search history.

(56) References Cited

U.S. PATENT DOCUMENTS

| | | | | |
|---|---|---|---|---|
| 2017/0085790 | A1* | 3/2017 | Bohn | H04N 23/90 |
| 2017/0103549 | A1* | 4/2017 | Cherubini | G06T 11/003 |
| 2017/0323431 | A1* | 11/2017 | Sarkar | G06T 7/0014 |
| 2018/0189574 | A1* | 7/2018 | Brueckner | H04N 19/10 |
| 2018/0204048 | A1* | 7/2018 | Chefd'hotel | G06F 18/23 |
| 2019/0114770 | A1* | 4/2019 | Song | G06V 10/454 |
| 2019/0311209 | A1* | 10/2019 | Ducote | H04N 23/698 |
| 2019/0355113 | A1* | 11/2019 | Wirch | G06T 7/32 |
| 2021/0059762 | A1* | 3/2021 | Ng | G06T 7/344 |
| 2022/0309653 | A1* | 9/2022 | Hassanpour | G06V 10/82 |

FOREIGN PATENT DOCUMENTS

| | | |
|---|---|---|
| CN | 108510495 A | 9/2018 |
| CN | 109685798 A | 4/2019 |

OTHER PUBLICATIONS

Albayrak, Abulkadir et al, A Whole Slide Image Grading Benchmark and Tissue Classification for Cervical Cancer Precursor Lesions with Inter-Observer Variability, Dec. 26, 2018, arXiv:1812.10256v1, pp. 1-15 (Year: 2018).*
Zarella, Mark et al, A Practical Guide to Whole slide Imaging, Feb. 2019, Arch Pathol Lab Med, vol. 143, pp. 222-234 (Year: 2019).*
International Search Report of PCT Patent Application No. PCT/CN2020/100950 issued on Oct. 13, 2020.

* cited by examiner

AUXILIARY PATHOLOGICAL DIAGNOSIS METHOD

TECHNICAL FIELD

The present disclosure relates to the field of disease diagnosis, and in particular to an auxiliary pathological diagnosis method.

BACKGROUND

As the "gold standard" for cancer detection, pathological diagnosis is to observe the histopathologic slide (usually stained with hematoxylin and eosin (HE)) sampled from the patient's lesion through a microscope so as to confirm the disease. The radiology department has entered the digital age, but the working status of pathologists is still in the age of "slide+optical microscope". In the Pathology Center, doctors observe pathological slide under a microscope, and write pathological reports on the computer. This process is repeated 200 to 300 times a day. Pathological diagnosis of cancer involves global tissue structure information and local differences and changes. It is complex and highly professional, and must be completed by senior pathologists.

The prior art cannot meet the demand for large-scale diagnosis, and manual operation brings a lot of repetitive work to pathologists. The processing of massive amounts of data requires sufficient manpower and material resources. However, currently, there is a serious shortage of pathologists, and hospitals generally face the problem of a long training cycle for pathologists. In addition, the digitization and intelligentialize of whole slide images are low, and the quality of diagnosis needs to be further improved.

Therefore, there is an urgent need for an auxiliary pathological diagnosis method as an auxiliary tool to help doctors perform diagnosis, so as to improve the quality of diagnosis and reduce the number of repetitive operations.

SUMMARY

In order to solve the above problem, an objective of the present disclosure is to provide an auxiliary pathological diagnosis method. The present disclosure assists doctors in disease diagnosis, so as to reduce the workload of doctors.

The auxiliary pathological diagnosis method includes:
 acquiring a whole slide image to be identified and patient information;
 inputting the whole slide image to be identified into a preset whole slide image model, and the whole slide image model outputs a diagnosis result of the whole slide image to be identified; and
 generating a diagnosis report based on the diagnosis result and the patient information.

The whole slide image model may be generated as follows:
 acquiring multiple pathological images as a training set, the pathological images corresponding to a first diagnosis result;
 training a neural network model by using the training set to obtain a second diagnosis result; and
 adjusting, if the first diagnosis result is different from the second diagnosis result, parameters of the neural network model until the first diagnosis result is the same as the second diagnosis result.

The parameters of the neural network model include: a bias weight of a convolution kernel, and a weight and a bias weight of a fully connected layer.

Before acquiring the whole slide image to be identified, the method may include:
 scanning a pathological slide at a first resolution to acquire a first whole slide image;
 determining at least one local area of the first whole slide image as a suspected lesion area;
 scanning the suspected lesion area at a second resolution to acquire a second whole slide image, where the second resolution is greater than the first resolution; and
 taking the second whole slide image as the whole slide image to be identified.

The acquiring the whole slide image to be identified may further include:
 subjecting the whole slide image to be identified to gray-scale processing to acquire a pathological gray-scale image to be identified;
 subjecting the pathological gray-scale image to be identified to noise filtering to acquire a distortion-free pathological gray-scale image to be identified; and
 identifying an area with an average gray-scale value less than a preset gray-scale value in the distortion-free pathological gray-scale image to be identified, and assigning black to the area with the average gray-scale value less than the preset gray-scale value in the distortion-free pathological gray-scale image to be identified.

The method may further include: generating a two-dimensional (2D) identification code based on the patient information.

The generating a diagnosis report based on the diagnosis result and the patient information may include:
 presetting a diagnosis report template;
 importing the diagnosis result into a first blank position of the diagnosis report template, where the diagnosis result includes the whole slide image to be identified, a pathological name, and a level of disease; and
 importing the patient information into a second blank position of the diagnosis report template, where the patient information includes a patient's name, gender, and identity (ID) card number.

The present disclosure further provides an auxiliary pathological diagnosis device, which includes:
 an acquisition module, for acquiring a whole slide image to be identified and patient information;
 an identification module, for inputting the whole slide image to be identified into a preset whole slide image model, and the whole slide image model outputs a diagnosis result of the whole slide image to be identified; and
 a report generation module, for generating a diagnosis report based on the diagnosis result and the patient information.

The present disclosure further provides a computer device, which includes:
 a memory, for storing a computer-readable instruction; and
 a processor, for running the computer-readable instruction to enable the computer device to implement the above method.

The present disclosure further provides a computer-readable storage medium, for storing a computer-readable instruction, where when the computer-readable instruction is executed by a computer, the computer may implement the above method.

The present disclosure inputs the whole slide image to be identified into the preset whole slide image model to obtain the diagnosis result. This process is accurate and fast, which greatly shortens the work flow of pathologists and saves labor costs. In addition, the present disclosure generates the diagnosis report based on the diagnosis result and the patient information. The pathologists only need to review the report and do not need to write the report manually.

BRIEF DESCRIPTION OF THE DRAWINGS

To describe the technical solutions in the embodiments of the present disclosure or in the prior art more clearly, the following briefly describes the drawings required for describing the embodiments or the prior art. Apparently, the drawings in the following description show merely some embodiments of the present disclosure, and a person of ordinary skill in the art may still derive other drawings from these drawings without creative efforts.

DETAILED DESCRIPTION

The technical solutions of the embodiments of the present disclosure are clearly and completely described below with reference to the drawings. Apparently, the described embodiments are merely a part rather than all of the embodiments of the present disclosure. All other embodiments obtained by those of ordinary skill in the art based on the embodiments of the present disclosure without creative efforts should fall within the protection scope of the present disclosure.

Figure 1:
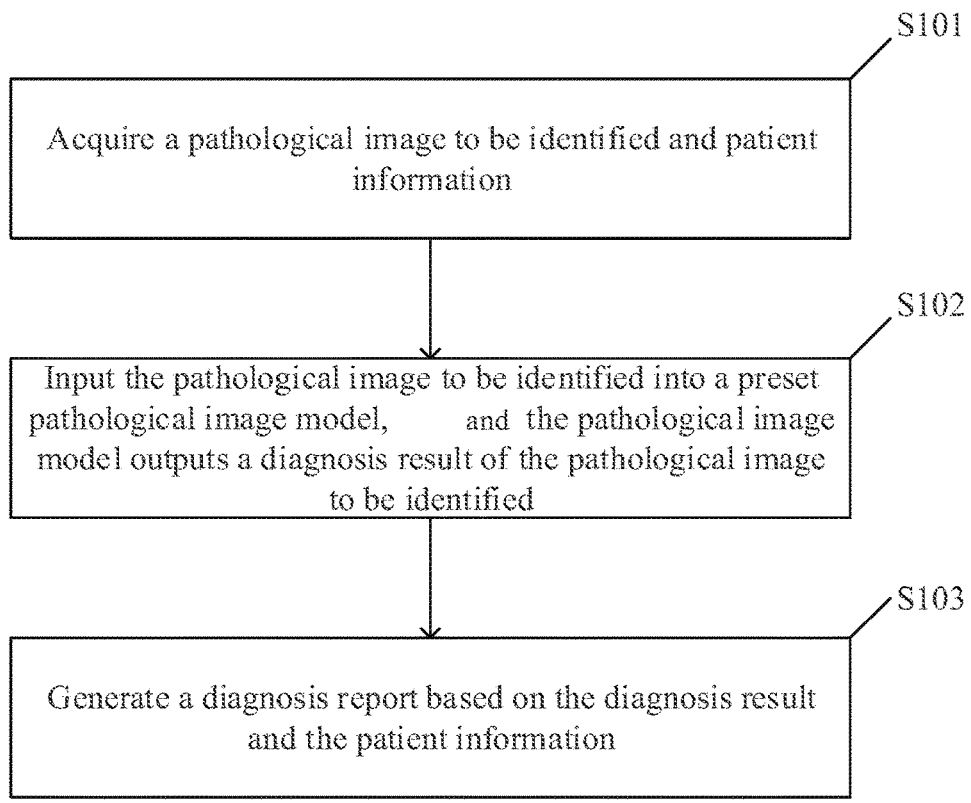
FIG. 1 is a flowchart of an auxiliary pathological diagnosis method according to an embodiment of the present disclosure.

FIG. 1 is a flowchart of an auxiliary pathological diagnosis method according to an embodiment of the present disclosure. The method includes:

S101: Acquire a whole slide image to be identified and patient information.

The whole slide image is also called a pathological electronic slide image, which is an image scanned by an electron microscope for pathological analysis, such as a whole slide image of the stomach or a whole slide image of the liver. whole slide images usually have the following characteristics. (1) There are many proprietary formats, such as sys, NanoZoomer digital pathology image (ndpi), which is mainly caused by the different settings of electron microscope manufacturers. (2) The image size is large, usually around 500 MB to 1.5 GB. (3) The resolution is high, usually above 40,000*40,000 pixels.

Before acquiring the whole slide image to be identified, the method includes:

Scan a pathological slide at a first resolution to acquire a first whole slide image.

After the pathological slide of a patient is acquired, the pathological slide is scanned at a relatively low first resolution, so as to acquire a complete lower-resolution first image of the pathological slide in a relatively short time. For example, in routine diagnosis, pathological slide are magnified 40 times to 100 times for scanning, and the resulting high-resolution scanned images (usually at the level of $10^5 \times 10^5$) occupy more than one hundred megabytes of storage space. In the embodiment of the present disclosure, the pathological slide may be optionally magnified 15 times for scanning, so as to acquire a scanned lower-resolution image, for example, at the level of $10^4 \times 10^4$. It is understandable that the above examples are only used for illustration and should not be understood as specific limitations.

Determine at least one local area of the first whole slide image as a suspected lesion area.

After the first image of the pathological slide is acquired, an artificial intelligence algorithm such as machine learning (ML) or deep learning (DL) may be used to determine at least one local area in the first image as a suspected lesion area. The suspected lesion area may be an area that is indeed a lesion, an area with a high probability of a lesion or an area with a high degree of attention from a doctor, which is not specifically limited in the embodiment of the present disclosure.

Scan the suspected lesion area at a second resolution to acquire a second whole slide image, where the second resolution is greater than the first resolution.

After the suspected lesion area in the first image with the first resolution is determined through the artificial intelligence algorithm, a corresponding position of the suspected lesion area on the pathological slide is scanned at the second resolution to acquire a second image of the suspected lesion corresponding to the suspected lesion area at the second resolution. It is understandable that in the second image, a non-suspected lesion area may be filled with a different color from the suspected lesion area, or it may be filled with a non-suspected lesion area in the first image, which is not specifically limited in the present disclosure.

Take the second whole slide image as the whole slide image to be identified.

After acquiring the whole slide image to be identified, the method further includes:

Subject the whole slide image to be identified to gray-scale processing to acquire a pathological gray-scale image to be identified.

Subject the pathological gray-scale image to be identified to noise filtering to acquire a distortion-free pathological gray-scale image to be identified.

Identify an area with an average gray-scale value less than a preset gray-scale value in the distortion-free pathological gray-scale image to be identified, and assign black to the area with the average gray-scale value less than the preset gray-scale value in the distortion-free pathological gray-scale image to be identified.

S102: Input the whole slide image to be identified into a preset whole slide image model, and the whole slide image model outputs a diagnosis result of the whole slide image to be identified.

Acquire multiple pathological images as a training set, the pathological images corresponding to a first diagnosis result.

Train a neural network model by using the training set to obtain a second diagnosis result.

Adjust, if the first diagnosis result is different from the second diagnosis result, parameters of the neural network model until the first diagnosis result is the same as the second diagnosis result.

The parameters of the neural network model include: a bias weight of a convolution kernel, and a weight and a bias weight of a fully connected layer.

The neural network model may be a regional classification network model and/or a segmentation convolutional neural network (CNN) model. The regional classification neural network model includes but is not limited to a residual network (ResNet) model, a VGG16 model, a VGG-Net model or an inception model. The segmentation CNN model includes but is not limited to a fully convolutional network (FCN) model, a multi-task network cascade (MNC) model or a mask-recurrent CNN (Mask-RCNN) model.

S103: Generate a diagnosis report based on the diagnosis result and the patient information.

Preset a diagnosis report template.

Import the diagnosis result into a first blank position of the diagnosis report template, where the diagnosis result includes the whole slide image to be identified, a pathological name, and a level of disease.

Import the patient information into a second blank position of the diagnosis report template, where the patient information includes a patient's name, gender, and identity (ID) card number, as well as age and home address.

The method further includes: generate a two-dimensional (2D) identification code based on the patient information, and import the 2D identification code into a third blank position of the diagnosis report.

The diagnosis report may be stored, managed, transmitted and reproduced by an electronic device, and may be understood as a digital version of a traditional paper medical record.

The diagnosis report may further include an admission record, admission diagnosis, a course record, an examination report, an inspection report, discharge diagnosis, etc. The admission record may include current medical history, past medical history, personal history, family history, auxiliary examination, etc.

The diagnosis report may also give corresponding rehabilitation suggestions based on the diagnosis result. For example, for a patient with a cold, the suggestions may be: drink plenty of water, keep warm, and avoid cold. For a patient with bronchitis, the suggestions may be: avoid spicy food, quit smoking, drink more tea, and have a light diet. For a patient with chronic pharyngitis, the suggestions may be: avoid staying up late, drink more water, and avoid spicy food. For a patient with chronic pneumonia, the suggestions may be: do chest expansion exercises often, and supplement water and electrolytes.

The diagnosis report may further be digitally signed and encrypted, and the identity of the diagnosing doctor as a user may be verified. Only a user with a legal identity can digitally sign the diagnosis report. After the signature is completed, an access authority may further be set for the diagnosis report, and only those with the access authority can decrypt and browse the diagnosis report.

The present disclosure inputs the whole slide image to be identified into the preset whole slide image model to obtain the diagnosis result. This process is accurate and fast, which greatly shortens the work flow of pathologists and saves labor costs. In addition, the present disclosure generates the diagnosis report based on the diagnosis result and the patient information. The pathologist only needs to review the report and does not need to write the report manually.

Figure 2:
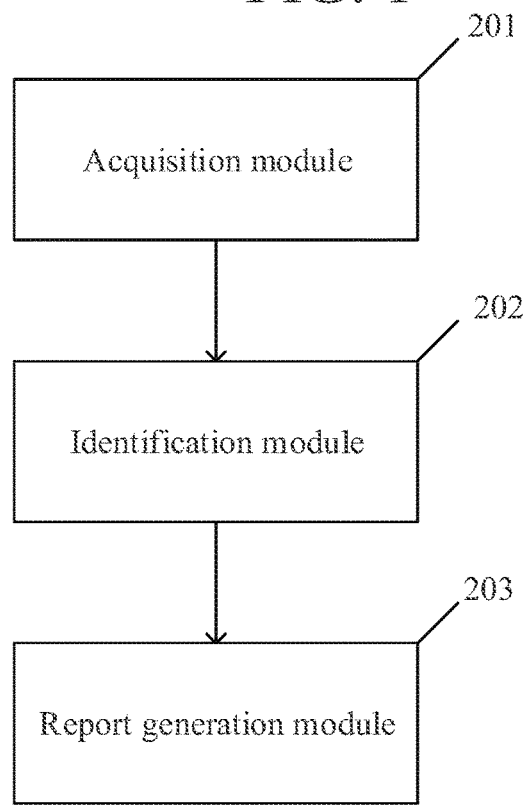
FIG. 2 is a block view of an auxiliary pathological diagnosis device according to an embodiment of the present disclosure.

FIG. 2 is a block view of an auxiliary pathological diagnosis device according to an embodiment of the present disclosure. The device includes:

an acquisition module, for acquiring a whole slide image to be identified and patient information;

an identification module, for inputting the whole slide image to be identified into a preset whole slide image model, and the whole slide image model outputs a diagnosis result of the whole slide image to be identified; and a report generation module, for generating a diagnosis report based on the diagnosis result and the patient information.

It should be noted that, the embodiments are described herein in a progressive manner. Each embodiment focuses on the difference from another embodiment, and the same and similar parts between the embodiments may refer to each other. For a device disclosed in the embodiments, since it corresponds to the method disclosed in the embodiments, the description is simple, and reference can be made to the method description.

An embodiment proposes a computer device. The computer device includes a memory and a processor. The method stores a computer-readable instruction. The computer-readable instruction is executed by one or more processors to implement the steps of the methods described in the above embodiment.

The computer device may also include a user interface, a network interface, a camera, a radio frequency (RF) circuit, a sensor, an audio circuit, a wireless fidelity (Wi-Fi) module, etc. The user interface may include a display, an input unit such as a keyboard, and an optional user interface may further include a universal serial bus (USB) interface, a card reader interface, etc. The network interface may optionally include a standard wired interface, a wireless interface (such as a Bluetooth interface and a WI-FI interface), etc.

In addition, an embodiment of the present disclosure further provides a computer readable storage medium, storing a computer program. When the program is executed by a processor, the steps of the control method for the photographic apparatus in the above embodiment are implemented.

The logic and/or steps represented in the flowchart or described in other manners herein, for example, may be considered as a sequenced list of executable instructions for implementing logical functions, and may be implemented in any computer-readable medium, for use by instruction execution systems, apparatuses, or devices (such as computer-based systems, systems including processors, or other systems that can fetch instructions from the instruction execution systems, apparatuses, or devices and execute the instructions), or used in combination with these instruction execution systems, apparatuses, or devices. For the purposes of this specification, a "computer-readable medium" may be any apparatus that can contain, store, communicate, propagate, or transmit a program for use by instruction execution systems, apparatuses, or devices or in combination with these instruction execution systems, apparatuses, or devices.

More specific examples (a non-exhaustive list) of the computer-readable medium include the following: an electrical connection (electronic device) with one or more wiring, a portable computer disk cartridge (magnetic device), a random access memory (RAM), a read-only memory (ROM), an erasable and editable read-only memory (an EPROM or a flash memory), a fiber optic device, and a portable compact disk read-only memory (CDROM). In addition, the computer-readable medium may even be a paper or other suitable mediums on which the program can be printed, because the program may be obtained electronically, for example, by optically scanning the paper or other mediums, followed by editing, interpreting, or processing in other suitable manners if necessary. The program is then stored in a computer memory.

It should be understood that the present disclosure may be implemented by using hardware, software, firmware, or a combination thereof. In the above implementations, multiple steps or methods may be implemented by using software or firmware that is stored in a memory and that is executed by a proper instruction execution system. For example, if implemented by using hardware, as in another embodiment, this implementation may be implemented by any one or a combination of the following technologies known in the art: a discrete logic circuit with a logic gate circuit for implementing a logic function on a data signal, an application-specific integrated circuit with a suitable combinational logic gate circuit, a programmable gate array (PGA), a field programmable gate array (FPGA), and the like.

In this specification, the description of "one embodiment", "some embodiments", "an example", "a specific example" and "some examples" means that a specific feature, structure, material or characteristic described in combination with the embodiment(s) or example(s) is included in at least one embodiment or example of the present disclosure. In this specification, the schematic descriptions of the above terms do not necessarily refer to the same embodiment or example. Moreover, the specific features, structures, materials or characteristics described may be combined in any suitable manner in any one or more embodiments or examples.

Although the embodiments of the present disclosure have been illustrated, it should be understood that those of ordinary skill in the art may still make various changes, modifications, replacements and variations to the above embodiments without departing from the principle and spirit of the present disclosure, and the scope of the present disclosure is limited by the claims and legal equivalents thereof.

The invention claimed is:

1. An auxiliary pathological diagnosis method, comprising:
    acquiring a whole slide image to be identified and patient information;
    inputting the whole slide image to be identified into a preset whole slide image model, and the whole slide image model outputting a diagnosis result of the whole slide image to be identified;
    generating a diagnosis report based on the diagnosis result and the patient information; and
    wherein before acquiring the whole slide image to be identified, the method comprises:
    scanning a pathological slide at a first resolution to acquire a first whole slide image;
    determining at least one local area of the first whole slide image as a suspected lesion area;
    scanning the suspected lesion area at a second resolution to acquire a second whole slide image, wherein the second resolution is greater than the first resolution; and
    taking the second whole slide image as the whole slide image to be identified.

2. The auxiliary pathological diagnosis method according to claim 1, wherein the whole slide image model is generated as follows:
    acquiring multiple pathological images as a training set, the pathological images are corresponding to a first diagnosis result;
    training a neural network model by using the training set to obtain a second diagnosis result; and
    adjusting, if the first diagnosis result is different from the second diagnosis result, parameters of the neural network model until the first diagnosis result is the same as the second diagnosis result.

3. The auxiliary pathological diagnosis method according to claim 2, wherein the parameters of the neural network model comprise: a bias weight of a convolution kernel, and a weight and a bias weight of a fully connected layer.

4. The auxiliary pathological diagnosis method according to claim 1, wherein the acquiring the whole slide image to be identified further comprises:
    subjecting the whole slide image to be identified to gray-scale processing to acquire a pathological gray-scale image to be identified;
    subjecting the pathological gray-scale image to be identified to noise filtering to acquire a distortion-free pathological gray-scale image to be identified; and
    identifying an area with an average gray-scale value less than a preset gray-scale value in the distortion-free pathological gray-scale image to be identified, and assigning black to the area with the average gray-scale value less than the preset gray-scale value in the distortion-free pathological gray-scale image to be identified.

5. The auxiliary pathological diagnosis method according to claim 1, wherein the method further comprises: generating a two-dimensional (2D) identification code based on the patient information.

6. The auxiliary pathological diagnosis method according to claim 1, wherein the generating a diagnosis report based on the diagnosis result and the patient information comprises:
    presetting a diagnosis report template;
    importing the diagnosis result into a first blank position of the diagnosis report template, wherein the diagnosis result comprises the whole slide image to be identified, a pathological name, and a level of disease; and
    importing the patient information into a second blank position of the diagnosis report template, wherein the patient information comprises a patient's name, gender, and identity (ID) card number.

7. A computer device, comprising:
    a memory, for storing a computer-readable instruction; and
    a processor, for running the computer-readable instruction to enable the computer device to implement the method according to claim 1.

8. A non-transitory_computer-readable storage medium, for storing a computer-readable instruction, wherein when the computer-readable instruction is executed by a computer, the computer implements the method according to claim 1.

* * * * *